United States Patent
Wells (10) Patent No.: US 7,289,714 B1
(45) Date of Patent: Oct. 30, 2007

(54) TUBING WRAP PROCEDURE

(75) Inventor: Dennis Ray Wells, Richfield, MN (US)

(73) Assignee: ADC Telecommunication, Inc., Eden Prairie, MN (US)

( * ) Notice: Subject to any disclaimer, the term of this patent is extended or adjusted under 35 U.S.C. 154(b) by 0 days.

(21) Appl. No.: 11/526,952

(22) Filed: Sep. 26, 2006

(51) Int. Cl.
*G02B 6/00* (2006.01)
*G02B 6/44* (2006.01)

(52) U.S. Cl. ............... 385/135; 385/100; 385/106; 385/109; 385/103

(58) Field of Classification Search ........ 385/100–106, 385/109, 110, 112, 114, 134–137
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |

(Continued)

FOREIGN PATENT DOCUMENTS

DE  35 37 684 A1  4/1987

(Continued)

OTHER PUBLICATIONS

"Cable Assemblies: Molding & Termination," http://www.dgo.com/prodcable.htm, 8 pages (Copyright 2001).

(Continued)

*Primary Examiner*—Hemang Sanghavi
(74) *Attorney, Agent, or Firm*—Merchant & Gould P.C.

(57) ABSTRACT

A telecommunications cable includes a distribution cable, a tether, and a tube. One end of a length of optical fiber optically couples to the distribution cable and the opposite end of the length of optical fiber optically couples to the tether cable. The tube is mounted over the length of optical fiber. The tube defines an opening adjacent one end of the tube. The tube includes fingers adjacent the opening having sufficient flexibility to enable the one end of the tube to wrap around buffer tubes of the distribution cable.

12 Claims, 8 Drawing Sheets

U.S. PATENT DOCUMENTS

| | | | |
|---|---|---|---|
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,185,544 A | 2/1993 | Takada |
| 5,194,692 A | 3/1993 | Gallusser et al. |
| 5,210,812 A | 5/1993 | Nilsson et al. |
| 5,215,930 A | 6/1993 | Lee et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 7,088,893 B2 | 8/2006 | Cooke et al. |
| 7,090,407 B2 | 8/2006 | Melton et al. |
| 7,113,679 B2 | 9/2006 | Melton et al. |
| 7,127,143 B2 | 10/2006 | Elkins, II et al. |
| 7,155,093 B2 | 12/2006 | Elkins, II et al. |
| 7,184,633 B2 | 2/2007 | Cooke et al. |
| 2004/0074852 A1 | 4/2004 | Knudsen et al. |
| 2004/0247265 A1 | 12/2004 | Takano et al. |
| 2005/0069275 A1 | 3/2005 | Brants et al. |
| 2005/0175308 A1 | 8/2005 | Elkins et al. |
| 2005/0259928 A1* | 11/2005 | Elkins et al. ............... 385/100 |
| 2005/0259930 A1 | 11/2005 | Elkins, II et al. |
| 2005/0276552 A1 | 12/2005 | Cooke et al. |
| 2006/0056782 A1 | 3/2006 | Elkins, II et al. |
| 2006/0115220 A1 | 6/2006 | Elkins, II et al. |
| 2006/0193573 A1* | 8/2006 | Greenwood et al. ........ 385/103 |

FOREIGN PATENT DOCUMENTS

| | | |
|---|---|---|
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-38828 | 5/1989 |
| JP | 2001-116968 | 4/2001 |
| WO | WO 2005/119322 A1 | 12/2005 |
| WO | WO 2006044080 A1 | 4/2006 |

OTHER PUBLICATIONS

"DAM/BLOK™ Electrical Splice Kit," http://www.pmiind.com/products/damblock.html, 2 pages (Copyright 2000).

"Factory Installed Termination System for Fiber Optic Cable Splices," 3 page (Copyright 2005).

"Installation Instructions for Pre-Connectorized MIC® Cable (2-6 Fiber) Equipped with Plug & Play™ Systems Pulling Grips," *Corning Cable Systems*, SRP-004-062, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, SRP-004-104, Issue 1, pp. 1-7 (Mar. 2005).

* cited by examiner

TUBING WRAP PROCEDURE

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

Figure 1:
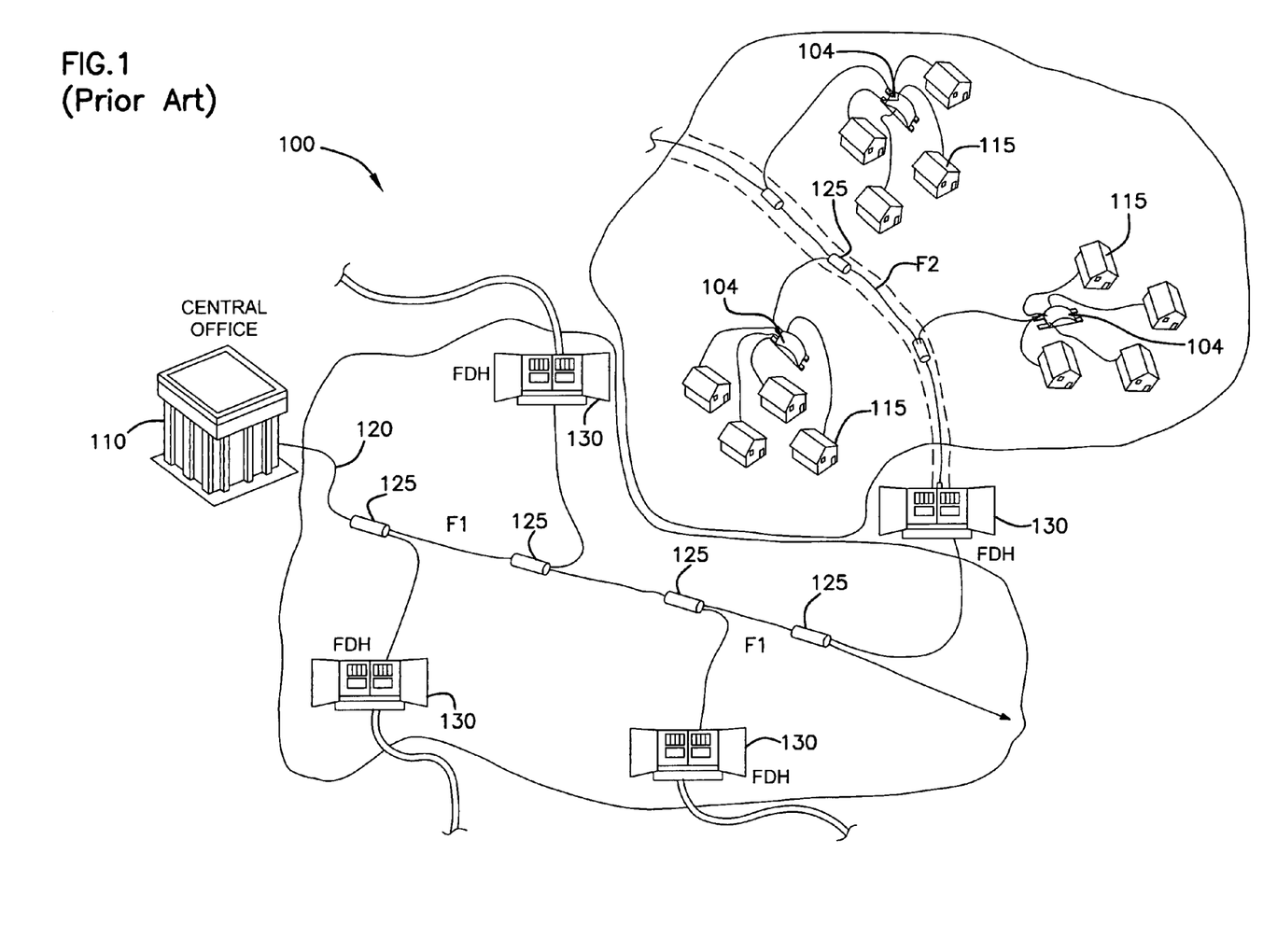
FIG. 1 shows a prior art passive fiber optic network.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1- to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations Branch cables can manually be separated out from a main cable in the field using field splices. Field splices are typically housed within sealed splice enclosures. Formation of the sealed splice enclosures can be tiime consuming and expensive. There exists a need in the art for low-cost enclosures to protect cable branch (i.e., breakout) locations.

SUMMARY

Certain aspects of the disclosure relate to fiber optic cable systems, packaging configurations and methods that facilitate the effective use and installation of pre-terminated fiber optic cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

The present disclosure relates to mid-span breakout arrangements provided on distribution cables. Each breakout arrangement is provided at a breakout location to protect the optical coupling of a tether to a distribution cable.

Figure 2:
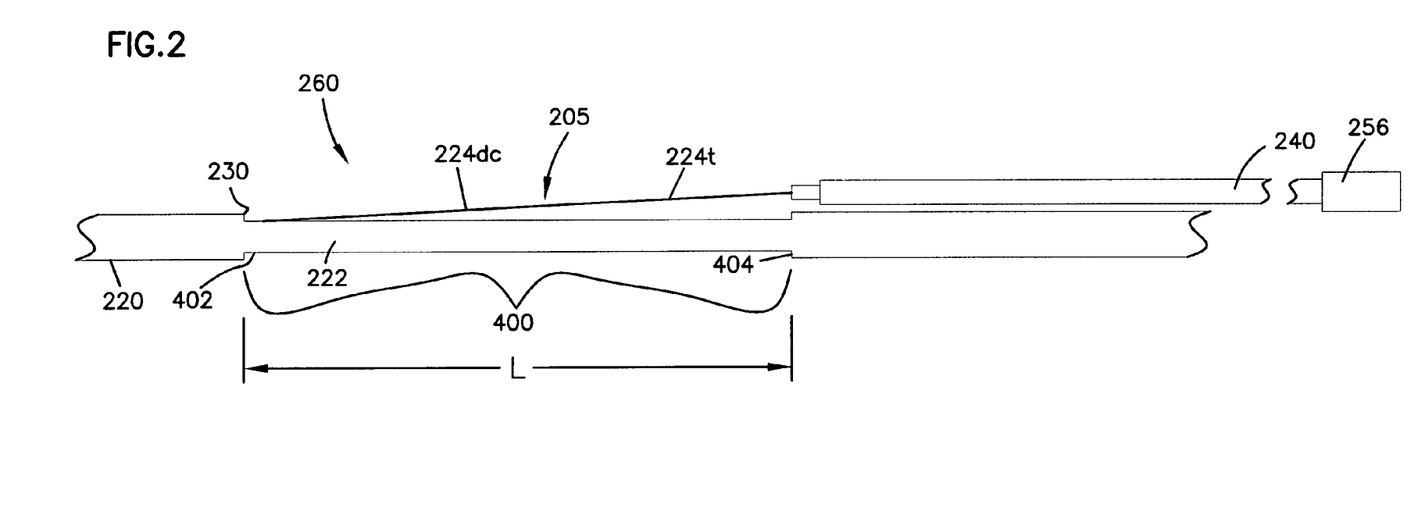
FIG. 2 is a side view of a tether branching from a distribution cable at a mid-span breakout location.

Referring now to the figures in general, a typical breakout location 260 is provided at an intermediate point along the length of a distribution cable 220 (e.g., see FIG. 2).

A tether 240 branches from the distribution cable 220 at the breakout locator 260. The fibers of the tether 240 are optically coupled to the fibers of the distribution cable 220.

A typical distribution cable includes a relatively large number of fibers (e.g., 72, 144 or more fibers). The fibers are typically positioned in at least one buffer tube. In certain embodiments, the fibers are typically segregated into separate groups with each group contained within a separate buffer tube. The fibers within each buffer tube can include either ribbon fibers or loose fibers.

Figure 3:
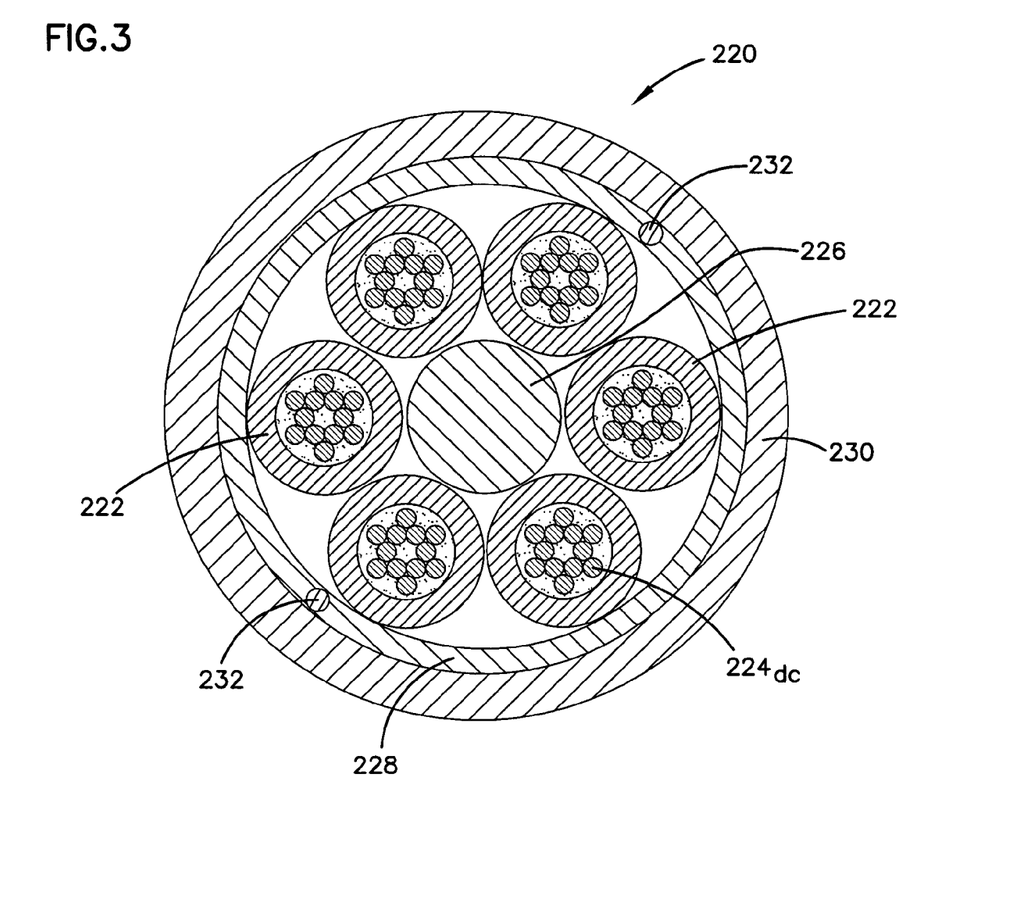
FIG. 3 is a cross-sectional view of an example distribution cable.

FIG. 3 shows an example distribution cable 220 including six separate buffer tubes 222 each containing twelve fibers $224_{dc}$. The buffer tubes 222 may be gel filled. The distribution cable 220 also includes a central strength member 226 for reinforcing the cable 220, and an outer strength layer/member 228 such as aramid fiber/yarn (e.g., Kevlar®) for also reinforcing the cable 220. The distribution cable 220 further includes an outer jacket 230 that encloses the buffer tubes 222. Ripcords 232 can be provided for facilitating tearing away portions of the jacket 230 to access the fibers $224_{dc}$ within the jacket 230.

The various aspects of the present disclosure are also applicable to distribution cables having fewer numbers of fibers (e.g., 2 or more fibers). Additionally, in alternative embodiments, the distribution cable can include an outer jacket enclosing a single buffer tube and at least two strength members extending on opposite sides of the single buffer tube (not shown). An outer strength layer/member, such as aramid fiber/yarn, can surround the single buffer tube within the jacket. The single buffer tube can enclose loose fibers or ribbon fibers.

A tether (e.g., a drop cable or a stub cable) 240 branches out from the distribution cable 220 at the breakout location 260 (e.g., see FIG. 2). Typically, the outer jacket 230 of the distribution cable is stripped to expose at least one of the buffer tubes 222 at a stripped region 400 (see FIG. 2). In general, the stripped region 400 has a length L. In one embodiment, the stripped region 400 has a length L of about ten inches.

One or more tether fibers (e.g., typically less than twelve fibers) $224_t$ (FIG. 4) are optically coupled (e.g., spliced) at a coupling location 205 to selected fibers $224_{dc}$ of the distribution cable 220 extending from one of the exposed buffer tubes 222 (e.g., see FIG. 2). For clarity, only a single tether fiber $224_t$ and distribution cable fiber $224_{dc}$ are shown coupled together in the figures (e.g., see FIG. 2). The opposite ends of the tether fibers $224_t$ are configured to optically couple to a drop terminal or other type of telecommunications equipment (not shown) offset from the breakout location 260. For example, the tether 240 can terminate in one or more fiber optic connectors 256 (e.g., see FIG. 2).

Figure 4:
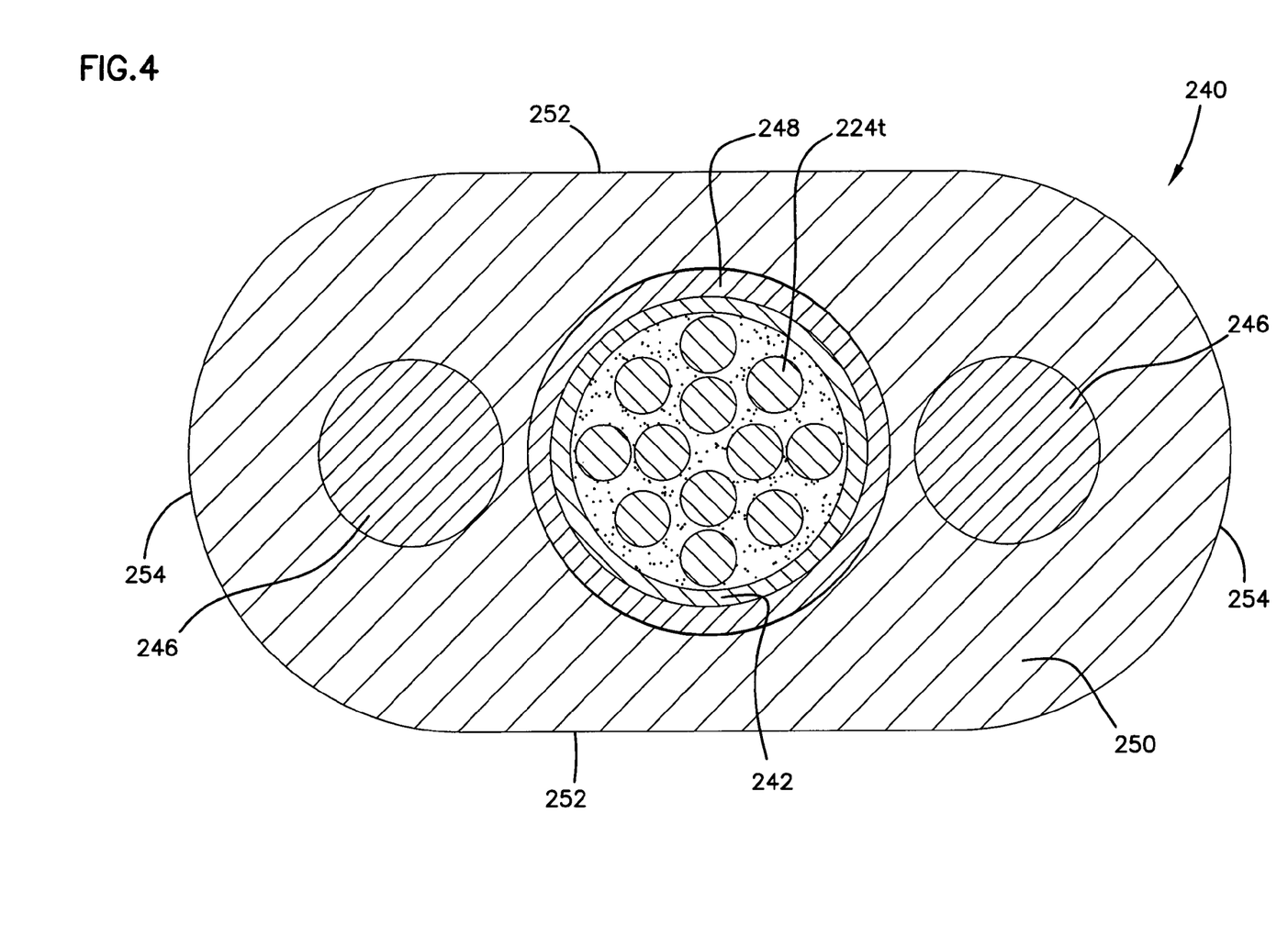
FIG. 4 is a cross-sectional view of an example tether cable.

FIG. 4 illustrates a tether cable 240 configured to join to the distribution cable 220 at the breakout location 260. The tether 240 is depicted as having a flat cable configuration. The flat cable configuration includes a central buffer tube 242 containing a plurality of fibers $224_t$ (e.g., typically one to twelve loose or ribbonized fibers). Strength members 246 (e.g., flexible rods formed by glass fiber reinforced epoxy) are positioned on opposite sides of the central buffer tube 242. An outer jacket 250 surrounds the strength members 246 and the buffer tube 242.

In the example shown, the outer jacket 250 includes an outer perimeter having an elongated transverse cross-sectional shape. As shown at FIG. 4, the transverse cross-sectional shape includes oppositely positioned, generally parallel sides 252 interconnected by rounded ends 254. However, any suitable cable configuration can be utilized for both the distribution cable and the tether cable. An additional strength layer 248 (e.g., aramid fiber/yarn) can be positioned between the buffer tube 242 and the outer jacket 250.

Figure 5:
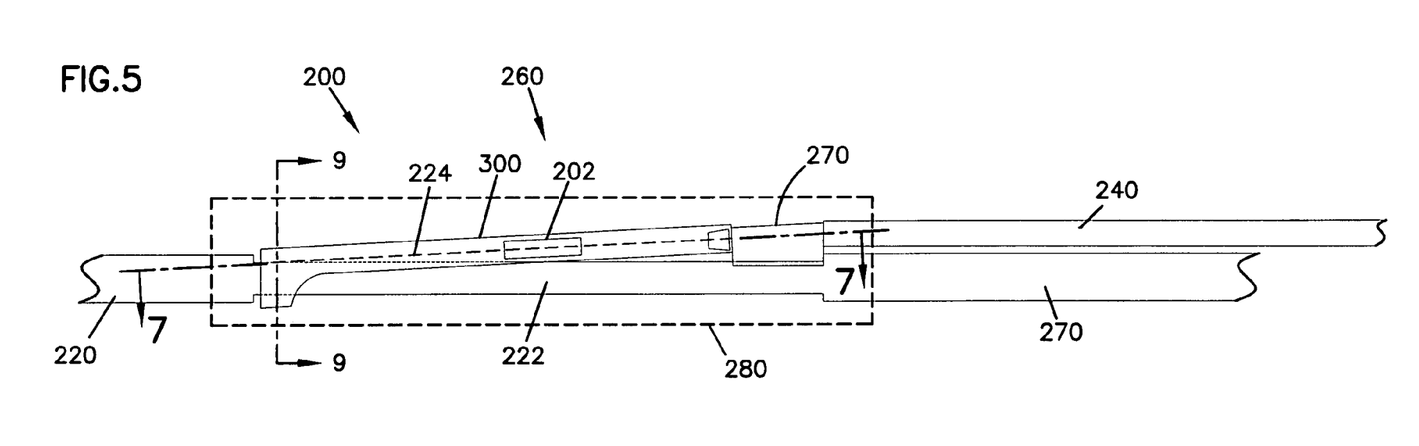
FIG. 5 is a side view of the tether and distribution cable of FIG. 2 with a tube and sleeve protecting the spliced optical fibers.

Referring to FIG. 5, a breakout assembly 200 can be installed on the distribution cable 220 at the breakout location 260 to protect the optically coupled fibers 224. In general, the breakout assembly 200 includes a sleeve 202 mounted over the coupling location 205 to protect the coupled optical fibers $224_{dc}$, $224_t$. Furthermore, when the tether 240 is secured to the distribution cable 220, the tether 240 should preferably be able to withstand a pullout force of at least one hundred pounds. To meet this pullout force requirement, the breakout assembly 200 also includes a retention block 270 (e.g., see FIGS. 5 and 6) configured to strengthen the mechanical interface between the tether 240 and the distribution cable 220.

Figure 6:
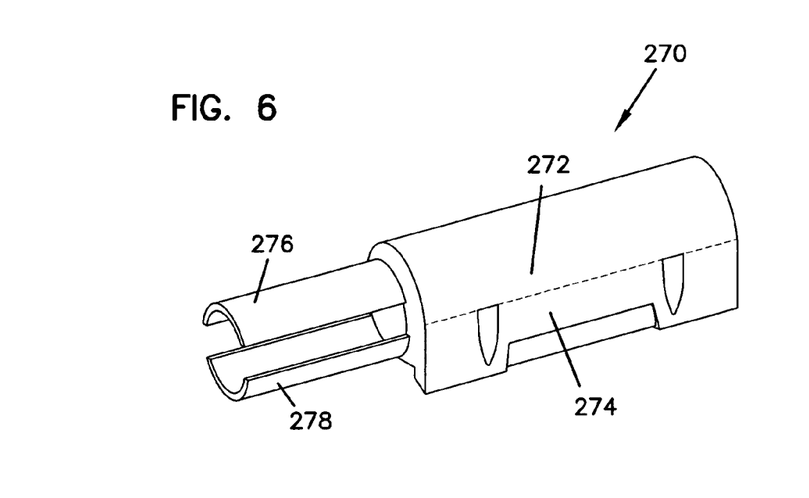
FIG. 6 is a front, perspective view of a retention block configured to secure a tether to a distribution cable.

FIG. 6 shows an example retention block 270 including a base 274 and a cover 272 between which the fiber $224_t$ of the tether 240 extends. First and second protrusions 276, 278 extend from the cover 272 and base 274, respectively. In one embodiment, the retention block 270 has a polycarbonate construction. Further details regarding the retention block 270 can be found in U.S. provisional application Ser. No. 60/781,280, filed Mar. 9, 2006, and entitled "FIBER OPTIC CABLE BREAKOUT CONFIGURATION," the disclosure of which is hereby incorporated by reference.

It is preferred for the fibers $224_t$ of the tether 240 to be pre-terminated to the fibers $224_{dc}$ of the distribution cable 220. "Pre-terminated" means that the fibers $224_t$ are fused (e.g., spliced) or otherwise connected to the fibers $224_{dc}$ of the distribution cable 220 at the factory as part of the cable manufacturing process rather than being field terminated. The remainder of the breakout assembly 200 is also preferably factory installed.

Figure 7:
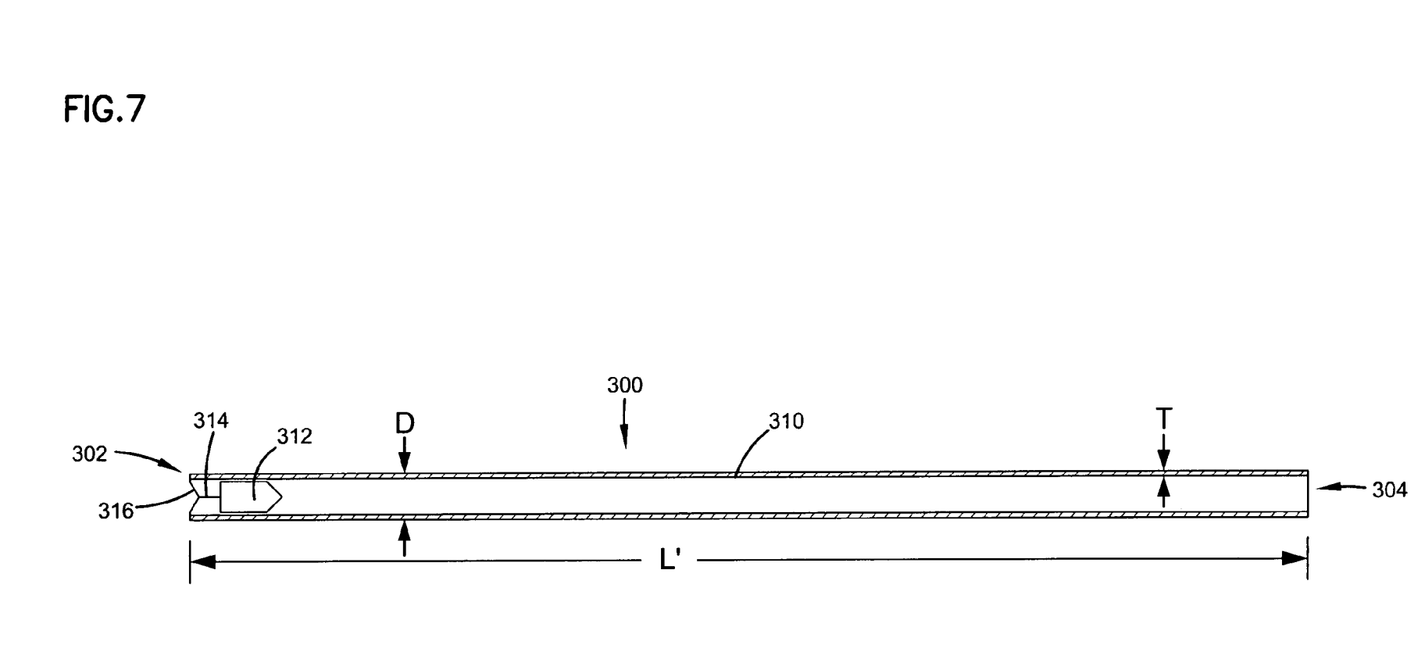
FIG. 7 is a bottom, cross-sectional view of the tube of FIG. 5 having a first end and a second end.
Figure 8:
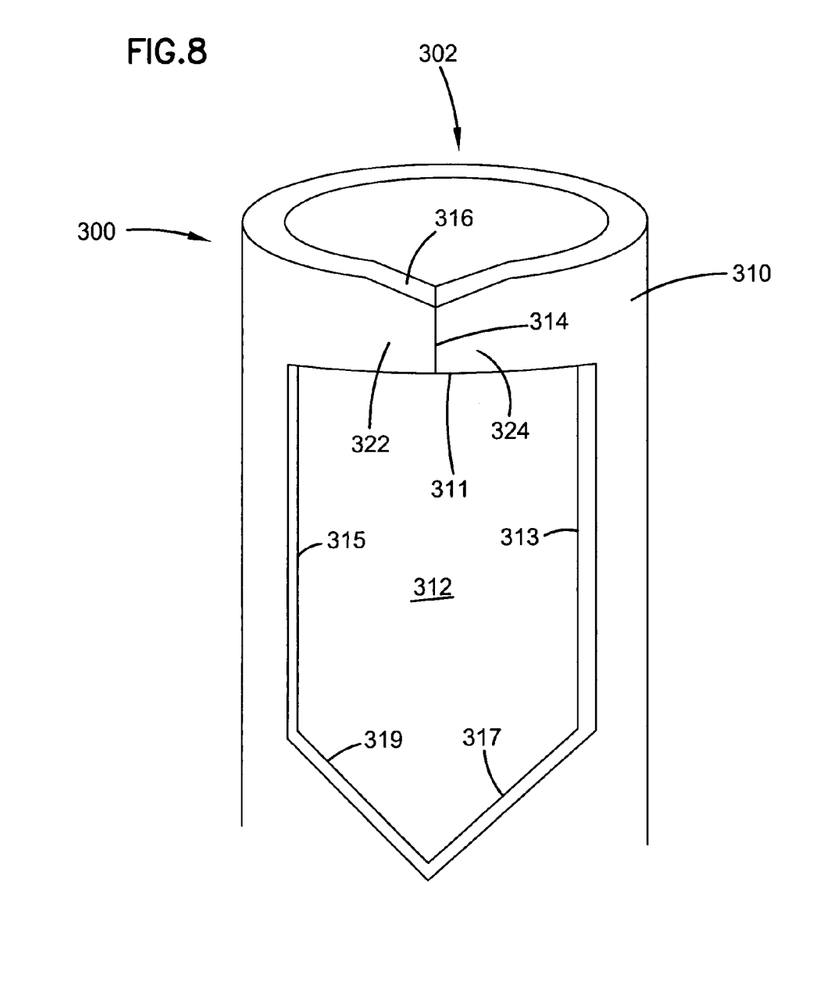
FIG. 8 is an enlarged view of the first end of the tube of FIG. 7.
Figure 9:
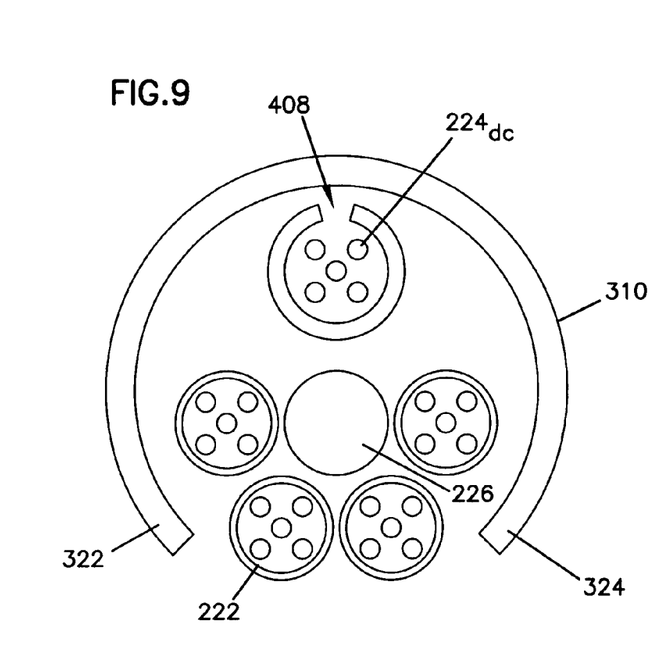
FIG. 9 is a cross-sectional view taken along the 9-9 line of FIG. 5.

Referring now to FIGS. 7-9, the breakout assembly 200 can also include a tube 300 having features that are examples of inventive aspects in accordance with the principles of the present disclosure. In general, the tube 300 has a body 310 extending from a first end 302 to a second end 304. Example materials forming the tube body 310 include Polyethylene, Fluorinated Ethylene Propylene (FEP), and other such plastics and/or resins.

In certain embodiments, the tube body 310 has a length L' (FIG. 7) that is less than the length L of the stripped region 400 (FIG. 2). In one such embodiment, the tube body 310 has a length L' that is about one inch less than the length L of the stripped region 400. In certain embodiments, the tube body 310 has a diameter D ranging from about ¼th of an inch to about a ½ inch. In one such embodiment, the diameter D of the tube body 310 is about ⅜$^{th}$ of an inch and a wall thickness T is about 1⁄32$^{nd}$ of an inch.

As best seen in FIG. 7, the tube body 310 defines an opening 312 adjacent the first end 302 of the tube 300. In general, the opening 312 is sized and shaped to enable the first end 302 of the tube 300 to be inserted/mounted over the buffer tubes 222 of the distribution cable 220 (e.g., see FIGS. 5 and 9). In general, the opening 312 is configured to enable the fused optical fibers 224 to extend out of a buffer tube 222 of the distribution cable 220, through the tube 300, and to the retention block 270 (e.g., see FIG. 5).

In the example shown in FIG. 8, the opening 312 is defined by five sides 311, 313, 315, 317, 319. Sides 313 and 315 are substantially parallel to one another. Side 311 is generally perpendicular to sides 313 and 315. Sides 317 and 319 form a pointy end of the opening 312. A slit 314 extends from side 311 the opening 312 to the first end 302 of the tube 300, thereby forming fingers 322 and 324 (e.g., see FIG. 8). In general, the fingers 322, 324 are capable of flexing radially outwardly to mount to the buffer tubes 222. In some embodiments, the fingers 322, 324 substantially wrap around the circumference of the buffer tubes 222 (e.g., see FIG. 5). In other embodiments, however, the fingers 322, 324 wrap around only a portion of the circumference of the buffer tubes 222 (e.g., FIG. 9).

In certain embodiments, a notch 316 is cut out of the periphery of the first end 302 of the tube at the slit 314. The notch 316 is defined by ramp surfaces that facilitate inserting the first end 302 of the tube 300 over the buffer tubes 222. When the first end 302 is pressed downwardly against the buffer tubes 222, the notch 316 can cause the fingers 322, 324 to flex apart and wrap around at least a portion of the circumference of the buffer tubes 222.

Figure 10:
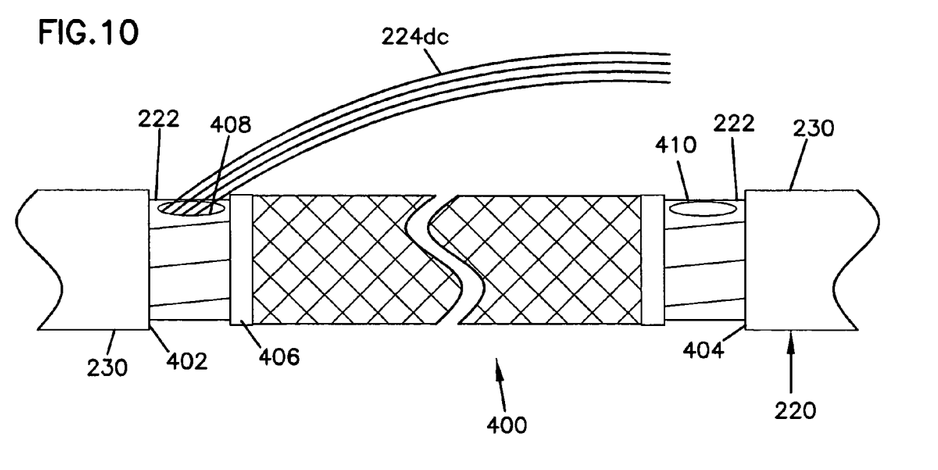
FIG. 10 shows an initial preparation of the distribution cable of FIG. 2 at the breakout location.
Figure 11:
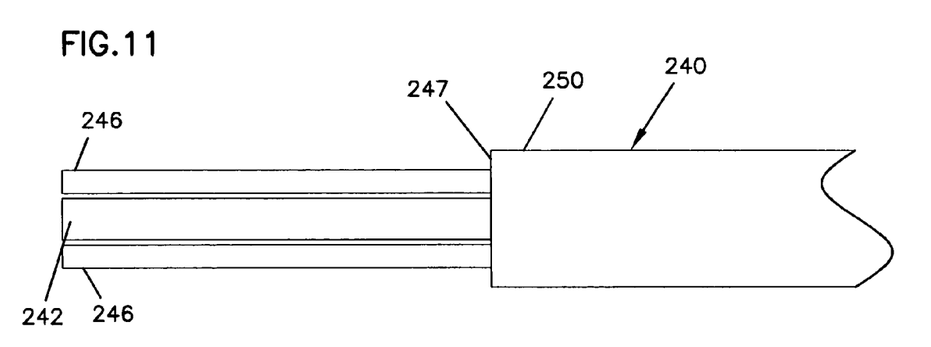
FIG. 11 shows an initial preparation of the tether of FIG. 2.
Figure 12:
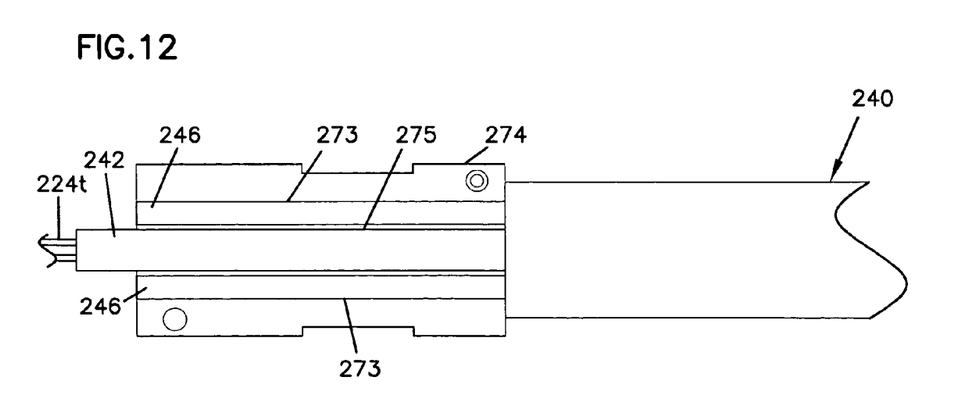
FIG. 12 shows the prepared tether being coupled to the retention block of FIG. 6.

Referring now to FIGS. 10-12, to prepare the breakout location 260 on the distribution cable 220, a portion of the outer jacket 230 is first stripped away to provide the stripped region 400 having a first end 402 and a second end 404. In certain embodiments, portions of a cable netting can be removed adjacent the first and second ends 402, 404 so that the buffer tubes 222 are exposed. The outer strength member 228 can also be displaced (e.g., bunched at one side of the cable 220) adjacent the ends 402, 404 to facilitate access to the buffer tubes 222 (not shown). Tape 406 can be used to inhibit the intermediate length of netting that remains at the breakout location 260 from unraveling (FIG. 10).

One of the buffer tubes 222 is then selected and a first window 408 is cut into the selected buffer tube 222 adjacent the first end 402 of the stripped region 400 and a second window 410 is cut into the buffer tube 222 adjacent the second end 404 of the stripped region 400. The fibers $224_{dc}$ desired to be broken out are accessed and severed at the second window 410. After the fibers $224_{dc}$ have been severed, the fibers $224_{dc}$ are pulled from the buffer tube 222 through the first window 408 (see FIG. 10). With the distribution cable 220 prepared as shown in FIG. 10, the fibers $224_{dc}$ are ready to be terminated to a prepared tether 240.

To prepare the tether 240 to be incorporated into the breakout assembly 200, a portion of the outer jacket 250 is stripped away to expose the central buffer tube 242 and the strength members 246 (see FIG. 11). As shown at FIG. 11, the central buffer tube 242 and the strength members 246 project outwardly beyond an end 247 of the outer jacket 250.

The strength layer 248 has been removed from around the buffer tube 242 and is not shown. After removing the end portion of the outer jacket 250, the strength members 246 are trimmed as shown at FIG. 12, and an end portion of the central buffer tube 242 is removed to expose the fibers $224_t$.

To connect the tether fibers $224_t$ to the distribution cable fibers $224_{dc}$, the sleeve 202 and tube 300 are first slid over the fibers $224_t$ of the tether 240. In certain embodiments, the sleeve 202 and tube 300 can be slid up over the buffer tube 242 and outer jacket 250 of the tether 240. The fibers $224_t$ of the tether are then optically coupled (e.g., spliced) to the fibers $224_{dc}$ of the distribution cable 220. After the fiber coupling process is complete, the sleeve 202 can be slid over the coupling location 205 (see FIG. 5). The tube 300 can be slid over the coupled fibers 224 and the sleeve 202.

The tether 240 then can be mounted to the base 274 of the retention block 270. For example, as shown in FIG. 12, the strength members 246 can be positioned within side grooves 273 of the base 274, and the central buffer tube 242 can be inserted within a central groove 275 of the base 274. Typically, the central buffer tube 242 has a length that extends beyond a first end of the base 274, and the strength members 246 have lengths that terminate generally at the first end of the base 274.

The first end 302 of the tube 300 is typically secured to the distribution cable 220 by wrapping the fingers 322, 324 of the tube 300 around the buffer tubes 222. The first end 302 can be secured to the distribution cable 220 either before or after securing the retention block 270 to the distribution cable 220. The second end 304 can be mounted to the protrusions 276, 278 of the retention block 270. In certain embodiments, tape is used to seal off the ends 302, 304 of the tube 300. For example, in one embodiment, two inch aluminum tape is wrapped around the buffer tubes 222 and the tube 300 at both ends 302, 304 of the tube 300 and adjacent the opening 312. Additional lengths of tape can also be used to further secure the tube 300 to the distribution cable 220.

The fibers are tested to confirm that the fibers meet minimum insertion loss requirements. After verifying insertion loss, an enclosure 280 (FIG. 5), such as an overmold, can be provided to enclose the breakout assembly 200. The enclosure 280 is preferably made of a flexible polymer plastic material. It is preferred for the enclosure 280 to be sized with a cross sectional shape sufficient to allow the breakout location to be readily passed through a one and one-half inch inner diameter conduit or a one and one-quarter inch diameter conduit. In certain embodiments, the breakout location 260 has a cross sectional area that can be passed through a one inch inner diameter conduit.

The above specification, examples and data provide a complete description of the manufacture and use of the invention. Since many embodiments of the invention can be made without departing from the spirit and scope of the invention, the invention resides in the claims hereinafter appended.

I claim:
1. A telecommunications cable comprising:
   a distribution cable including a cable jacket and at least one buffer tube positioned within the cable jacket, the distribution cable including a breakout location where a portion of the distribution cable jacket has been removed to form a stripped region and where the at least one buffer tube includes a fiber access location;

a tether including a tether jacket, a tether buffer tube positioned within the tether jacket;

a length of optical fiber extending from a first end to a second end, the first end being optically coupled to the distribution cable and the second end being optically coupled to the tether; and a tube having a hollow body positioned about the length of optical fiber, the body defining an opening adjacent a first end of the body, the body being slit from the first end of the body to the opening to form first and second fingers, the fingers being configured to flex sufficiently to wrap around the at least one buffer tube of the distribution cable adjacent the fiber access location.

2. The telecommunications cable of claim 1, wherein a second, opposite end of the tube is positioned adjacent the tether buffer tube.

3. The telecommunications cable of claim 1, wherein the tube is formed from polyethylene.

4. The telecommunications cable of claim 1, wherein the tube is formed from Fluorinated Ethylene Propylene.

5. The telecommunications cable of claim 1, wherein the tube has a diameter of about $3/8^{th}$ of an inch.

6. The telecommunications cable of claim 1, wherein the tube is secured to the at least one buffer tube of the distribution cable using Aluminum tape.

7. The telecommunications cable of claim 1, wherein the telecommunications cable is sized to be pulled through a conduit having a 1.25 inch inner diameter.

8. The telecommunications cable of claim 1, wherein the tether is a drop cable.

9. The telecommunications cable of claim 1, wherein the opening in the tube is defined by five sides.

10. The telecommunications cable of claim 1, wherein the first end of the tube includes a periphery.

11. The telecommunications cable of claim 10, wherein the tube includes a notch in the periphery of the first end of the tube adjacent the opening.

12. The telecommunications cable of claim 1, wherein the tube has a first length and the stripped region has a second length, and wherein the first length is about one inch less than the second length.

* * * * *

UNITED STATES PATENT AND TRADEMARK OFFICE
CERTIFICATE OF CORRECTION

| | | |
|---|---|---|
| PATENT NO. | : 7,289,714 B1 | Page 1 of 1 |
| APPLICATION NO. | : 11/526952 | |
| DATED | : October 30, 2007 | |
| INVENTOR(S) | : Wells | |

It is certified that error appears in the above-identified patent and that said Letters Patent is hereby corrected as shown below:

On the Title Page

Page 2, Item (56) References Cited, U.S. Patent Documents: "5,185,544 A  2/1993  Takada" should read --5,185,844 A  2/1993  Bensel, III et al.--

Page 2, Item (56) References Cited, U.S. Patent Documents: "5,215,930 A  6/1993  Lee et al." should read --6,215,930 B1  4/2001  Estes et al.--

Signed and Sealed this
Sixteenth Day of December, 2014

Michelle K. Lee
*Deputy Director of the United States Patent and Trademark Office*